US006601084B1

United States Patent
Bhaskaran et al.

(10) Patent No.: US 6,601,084 B1
(45) Date of Patent: Jul. 29, 2003

(54) DYNAMIC LOAD BALANCER FOR MULTIPLE NETWORK SERVERS

(75) Inventors: Sajit Bhaskaran, Sunnyvale, CA (US); Abraham R. Matthews, San Jose, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 08/992,038

(22) Filed: Dec. 19, 1997

(51) Int. Cl.$^7$ ................................................. G06F 9/00
(52) U.S. Cl. ....................... 709/105; 709/223
(58) Field of Search ...................... 709/105, 223–226, 709/229

(56) References Cited

U.S. PATENT DOCUMENTS

| | | | | |
|---|---|---|---|---|
| 5,283,897 A | * | 2/1994 | Georgiadis et al. | 709/105 |
| 5,473,599 A | | 12/1995 | Li et al. | 370/219 |
| 5,586,121 A | | 12/1996 | Moura et al. | 370/404 |
| 5,612,865 A | * | 3/1997 | Dasgupta | 700/79 |
| 5,612,897 A | | 3/1997 | Rege | 709/219 |
| 5,634,125 A | * | 5/1997 | Li | 707/203 |
| 5,687,369 A | * | 11/1997 | Li | 707/203 |
| 5,754,752 A | | 5/1998 | Sheh et al. | 714/4 |
| 5,796,941 A | * | 8/1998 | Lita | 713/201 |
| 5,812,819 A | | 9/1998 | Rodwin et al. | 703/23 |
| 5,815,668 A | | 9/1998 | Hashimoto | 709/238 |
| 5,835,696 A | | 11/1998 | Hess | 714/10 |
| 5,936,936 A | | 8/1999 | Alexander, Jr. et al. | 370/216 |
| 5,951,634 A | * | 9/1999 | Sitbon et al. | 709/105 |

FOREIGN PATENT DOCUMENTS

| | | | | |
|---|---|---|---|---|
| WO | WO 99/32956 | | 7/1999 | G06F/0/00 |

OTHER PUBLICATIONS

Internet. "Quasi–Dynamic Load–Balancing (QDLB) Methods." Apr. 25, 1995, pp. 2 and 5.
(INTERNET) "Dynamic Load–Balancing Methods", Apr. 25, 1995.*
(Becker) Becker, Wolfgang. "Dynamic Load Balancing for Parallel Database Processing", 1997.*
(Omiecinski) Omiencinski, Edward. "Performance Analysis of a Load Balancing Hash–Join Algorithm for a Shared Memory Multiprocessor", 1991.*
(IBM) "Value–Oriented Approach fto Selecting Buckets for Data Redistribution", May 1, 1993.*

* cited by examiner

Primary Examiner—Alvin Oberley
Assistant Examiner—Lewis A. Bullock, Jr.
(74) Attorney, Agent, or Firm—David Volejnicek

(57) ABSTRACT

The present invention provides methods and systems for balancing the load on a plurality of servers using a load balancing algorithm which continuously examines the loads on the plurality of servers and makes adjustments in the loads accordingly. Among the factors considered in the load balancing are the power of each server relative to other servers, the load on each server relative to the other servers, and a "credit" for each server based on their power and load.

37 Claims, 10 Drawing Sheets

DYNAMIC LOAD BALANCER FOR MULTIPLE NETWORK SERVERS

CROSS REFERENCE TO RELATED APPLICATIONS

Application Ser. No. 08/994,709 entitled "Gross-Platform Server Clustering Using A Network Flow Switch," now U.S. Pat. No. 6,266,335, discloses and claims flow switch features used in the system of this invention. Application Ser. No. 08/994,405 entitled "Router Pooling in a Network Flow Switch," now. U.S. Pat. No. 5,963,540, discloses and claims router fault tolerance and router load balancing features used in the system of this invention. All of these applications are incorporated herein by reference in their entirety.

CROSS REFERENCE TO APPENDIX

Appendix A, which is part of the present disclosure, is a listing in psuedocode of software code for embodiments of the present invention, which are described more completely below.

BACKGROUND OF THE INVENTION

1. Field of the invention

The present invention relates generally to computer networking and, in particular, to a system to perform load balancing on multiple network servers.

2. Discussion of Related Art

Due to increasing traffic over computer networks such as the Internet, as well as corporate intranets, WANs and LANs, data providers must satisfy an increasing number of data requests. For example, a company that provides a search engine for the Internet may handle over a million hits (i.e. accesses to its web page) every day. A single server cannot handle such a large volume of data requests within an acceptable response time. Therefore, most high-volume information providers use multiple servers to satisfy the large number of data requests.

The prior art does not take into account packets per given time interval, and other measures of packet traffic to and from each replicated server. One reason this is not done is because it takes a great number of CPU cycles to compute this on a continual basis for each server that may be connected to a load balancer, which typically is based on a general purpose microprocessor driven by a software program. There is a need for a solution that overcomes this technical hurdle and incorporates packet traffic loads on the network interfaces belonging to the servers, as packet loss at the server network interface is a frequent reason for throughput and performance degradation.

FIG. 1 illustrates a typical arrangement of computers on a network 110. Network 110 represents any networking scheme such as the internet, a local ethernet, or a token ring network. Various clients such as a client 120 or a client 130 are coupled to network 110. Computer equipment from a data provider 160 is also coupled to network 110. For example, data provider 160 may use a bridge 161 to connect a local area network (LAN) 163 to network 110. Servers 162, 164, 166, and 168 are coupled to LAN 163.

Most data transfers are initiated by a client sending a data request. For example, client 120 may request a web page from data provider 160. Typically, on the internet, client 120 requests information by sending a data request to a name such as "www.companyname.com" representing data provider 160. Through the use of the domain name server system of the internet, the name is converted into a IP address for data provider 160. Client 120 then sends a data request to the IP address. The data request contains the IP address of client 120 so that data provider 160 can send the requested data back to client 120. Data provider 160 converts the IP address into the IP address of server 162, server 164, server 166, or server 168. The data request is then routed to the selected server. The selected server then sends the requested data to client 120. For other networks, the specific mechanism for routing a data request by client 120 to data provider 160 can vary. However, in most cases data requests from client 120 contain the network address of client 120 so that data provider 160 can send the requested data to client 120.

Since each of the multiple servers contain the same information, each data request can be handled by any one of the servers. Furthermore, the use of multiple servers can be transparent to client 120. Thus the actual mechanism used to route the data request can be determined by data provider 160 without affecting client 120. To maximize the benefits of having multiple servers, data provider 160 should spread the data requests to the servers so that the load on the servers are roughly equal. Thus, most data providers use a load balancer to route the data requests to the servers. As shown in FIG. 2, conceptually a load balancer 210 receives multiple data requests 220 and routes individual data requests to server 162, 164, 166, or 168. In FIG. 2, four servers are shown for illustrative purposes only. The actual number of servers can vary. Multiple data requests 220, represent the stream of data requests from various clients on network 110.

Some conventional load balancing methods include: random assignment, modulo-S assignment where S represents the number of servers, and sequential assignment. In random assignment, load balancer 210 selects a server at random for each data request. In modulo-S assignment, each server is assigned a number from 0 to S−1 (where S is the number of servers). Load balancer 210 selects the server which corresponds to the address of the client making the data request modulo-S. In sequential assignment, each server is selected in turn for each new data request. Thus, if eight data requests are received, server 162 processes data requests one and five; server 164 processes data requests two and six; server 166 processes data requests three and seven; and server 168 processes data requests four and eight.

On the average over many data requests, each of the conventional load balancing methods should provide adequate load balancing. However, short term imbalances can result from a variety of sources. For example, if some data requests require more data than other data requests, all three methods may overload one server while other servers are idle. If the majority of data requests come from clients which are mapped to the same server using modulo-S assignment, one server becomes overloaded while others servers are underloaded. Thus, conventional load balancing methods do not provide balanced loads in many circumstances. Furthermore, conventional load balancing methods do not adapt to conditions of the servers. Hence there is a need for a load balancer which uses a dynamic load balancing method which can consistently balance the load on a plurality of servers.

SUMMARY OF THE PRESENT INVENTION

The present invention includes methods and systems for consistently balancing the load on a plurality of servers. Specifically, the load balancer uses hashing to separate data requests from clients into a plurality of buckets. The buckets are dynamically assigned to the server having the lightest load as necessary.

The load balancer tracks the state of each server. A server is in the non-operational state if it is deemed to be unable to perform the service. The load balancer maintains a list of servers that are operational and assigns buckets only to servers that are operational.

The server fault tolerance mechanism in the load balancer detects when a server goes down and redistributes the load to the new set of operational servers. Additionally, when previously non-operational server becomes operational, the traffic is redistributed over the new set of operational servers. This redistribution is done in such a manner as not to disrupt any existing client-server connections.

DETAILED DESCRIPTION

According to the principles of this invention, certain limitations imposed by conventional load balancers have been overcome. The present invention provides a load balancer that monitors the load on each server to determine how to allocate data requests among the servers. Specifically, the load balancer separates the data requests into buckets and assigns buckets to the least loaded server.

Figure 1:
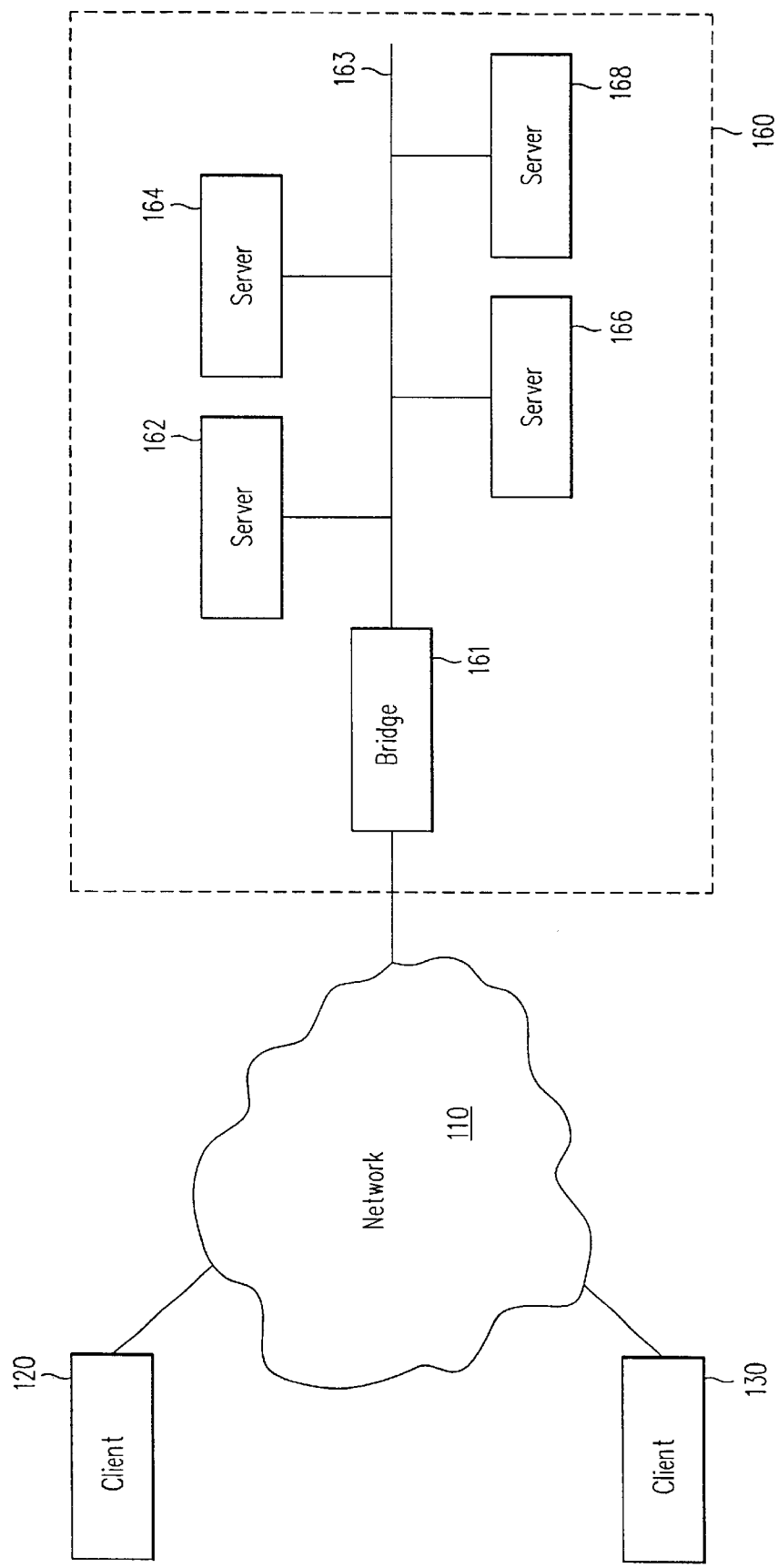
FIG. 1 is a representational showing of a prior art network connecting a plurality of servers to a plurality of clients.
Figure 2:
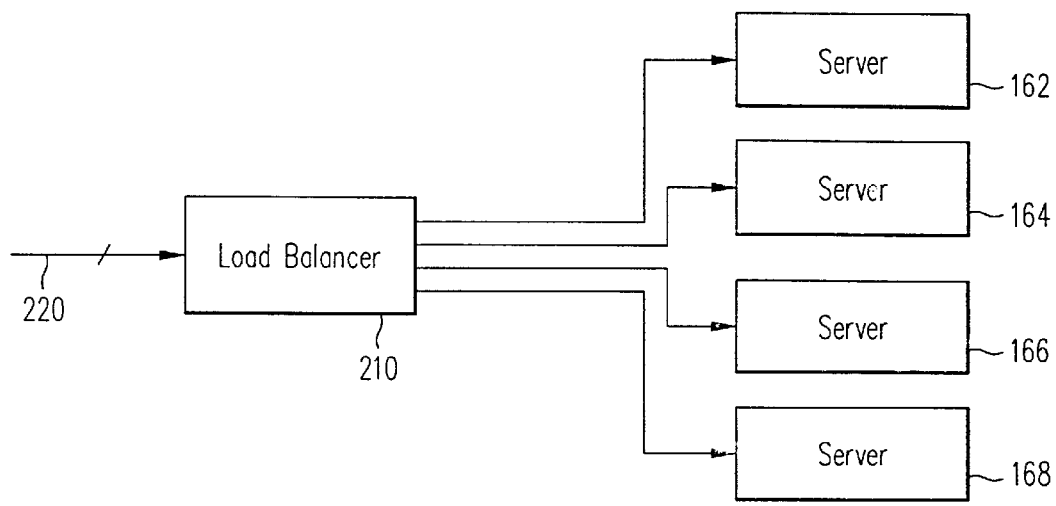
FIG. 2 illustrates a prior art load balancer connecting a network to a plurality of servers.
Figure 3:
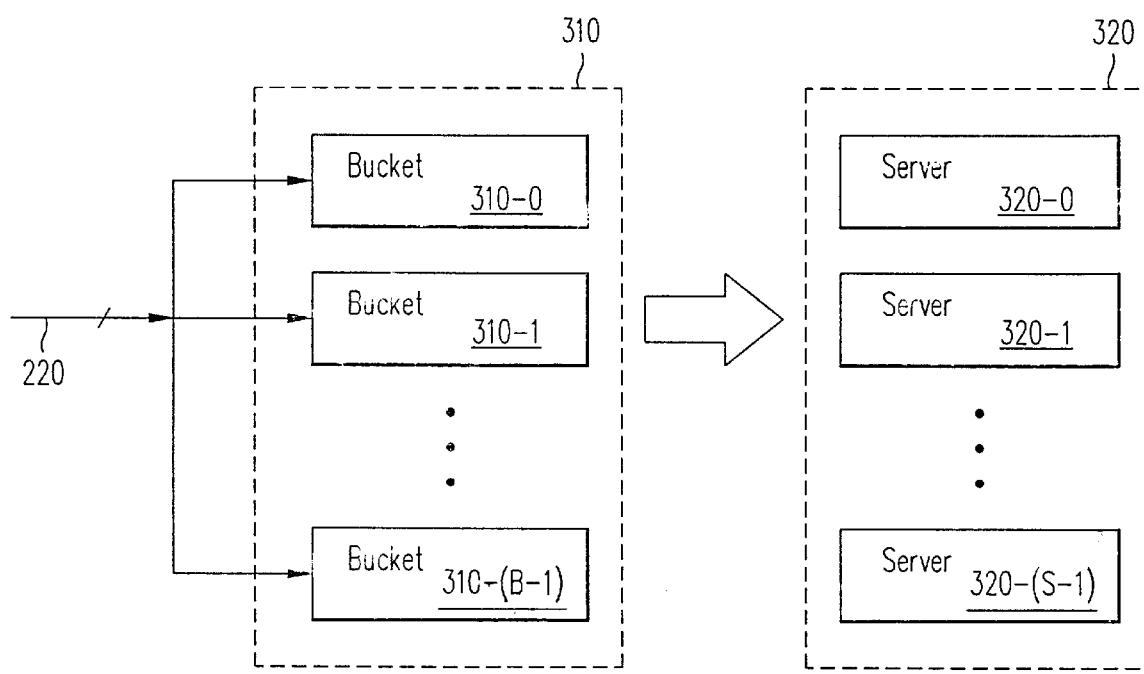
FIG. 3 illustrates how a load balancer in accordance with this invention determines to which server multiple data requests are allocated.

FIG. 3 illustrates conceptually how a load balancer in accordance with one embodiment of the invention determines to which server each data request is allocated. Multiple data requests 220 are separated into a first plurality of buckets 310. As used herein, the number of buckets is B and the buckets in the first plurality of buckets 310 are numbered from 310_0 to 310_(B−1). Each bucket is assigned to one server in a plurality of servers 320, as explained below. As used herein, the number of servers is equal to S and the individual servers are numbered 320_0 to 320_(S−1). As explained in detail below, a single bucket can be separated into a plurality of child buckets.

To increase flexibility, the number of buckets B should be user configurable. Generally, a larger number of buckets B will result in a more balanced load on the servers. However, if the address space of the clients making data requests is large, a smaller number of buckets B is acceptable. In one specific embodiment of a load balancer in accordance with the present invention, the number of buckets B is configurable to be 64 or 128 or 256.

In one embodiment of the present invention, data requests are assigned to buckets using modulo-B assignment based on the address of the client making the data request. Thus, in this embodiment, a data request is assigned to bucket 310_((Client_Address) MOD B). Therefore, data requests from different clients may share the same bucket. One benefit of using modulo-B assignment is to cause all data requests from a single client to be assigned to the same bucket in plurality of buckets 310. Since each bucket is assigned to only one server, all data requests from a single client are directed to a single server. If having all of a clients data requests directed to a single server is not important, other methods such as random assignment or sequential assignment can be used to assign data requests to plurality of buckets 310.

Figure 4:
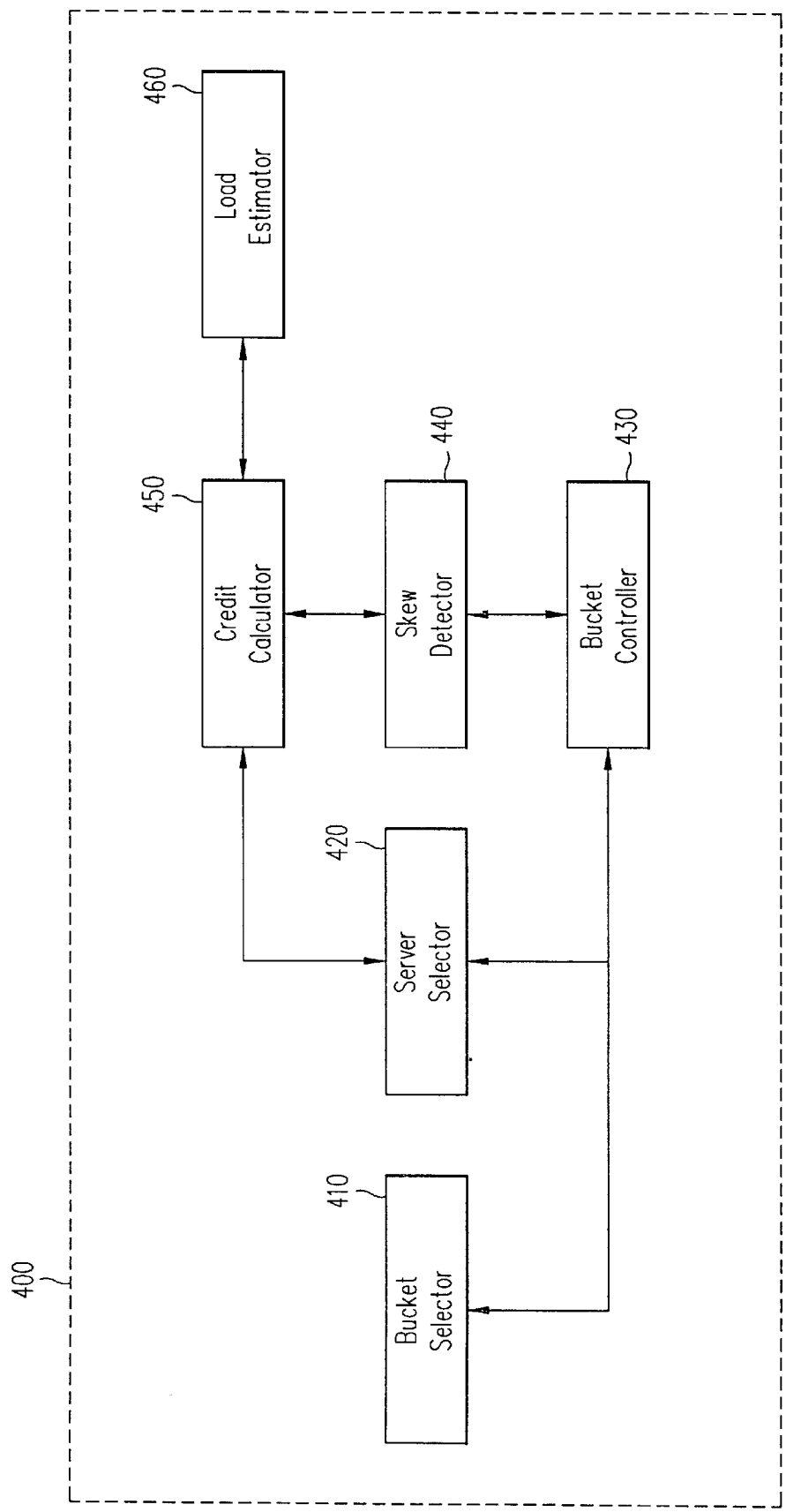
FIG. 4 is a block diagram of a load balancer in accordance with one embodiment of this invention.

FIG. 4 is a block diagram of a load balancer 400 in accordance with one embodiment of the present invention. In FIG. 4, a bucket selector 410 assigns data requests in multiple data requests 220 to buckets of first plurality of buckets 310 (FIG. 3). A server selector 420 assigns buckets from first plurality of buckets 310 as well as other buckets created by a bucket controller 430 (as explained below) to servers in plurality of servers 320. Server selector 420 assigns a bucket to a server based on data from credit calculator 450, bucket controller 430, and bucket selector 410. Server selector 420 assigns unassigned buckets to the server with the largest credit as determined by credit calculator 450.

Load estimator 460 monitors various load statistics about the servers to determine the load on each server. Credit calculator 450 determines the amount of free resources or credit that each server has remaining from the load estimates provided by load estimator 460. Skew detector 440 uses the credit of each server to determine whether the load balancing between the servers is in a tolerable range. If the load is skewed, i.e., outside the tolerable range, skew detector 440 signals bucket controller 430 to create additional buckets, as explained below.

Figure 5A:
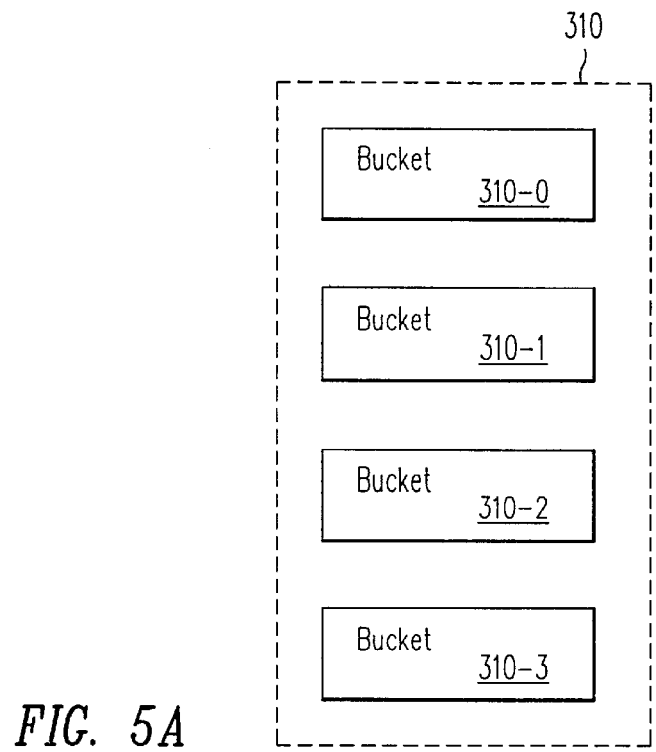
FIGS. 5a and 5b illustrate multi-mode buckets used in some embodiments of the invention.
Figure 5B:
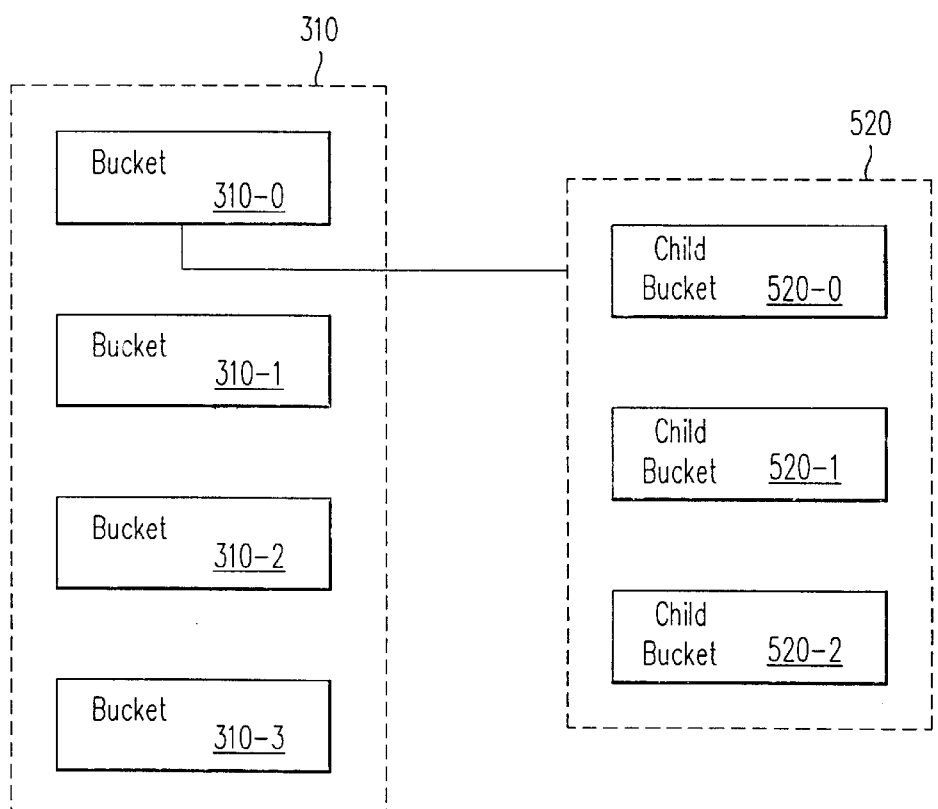
Figure 6A:
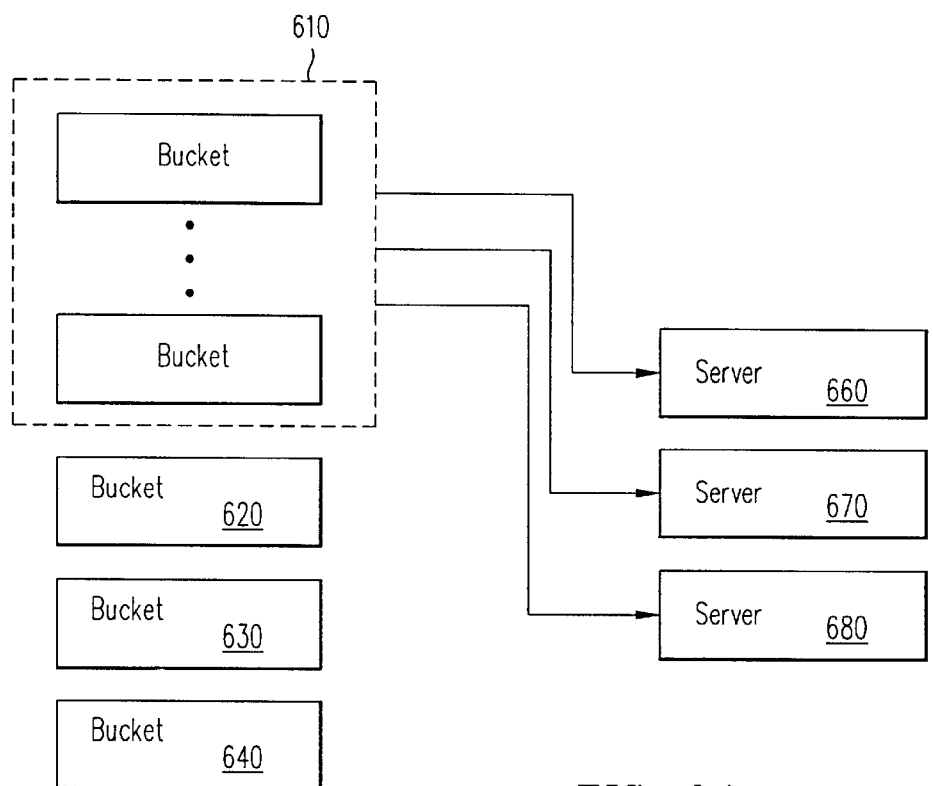
FIGS. 6a–6d illustrate the effect of a new bucket assignment.
Figure 6B:
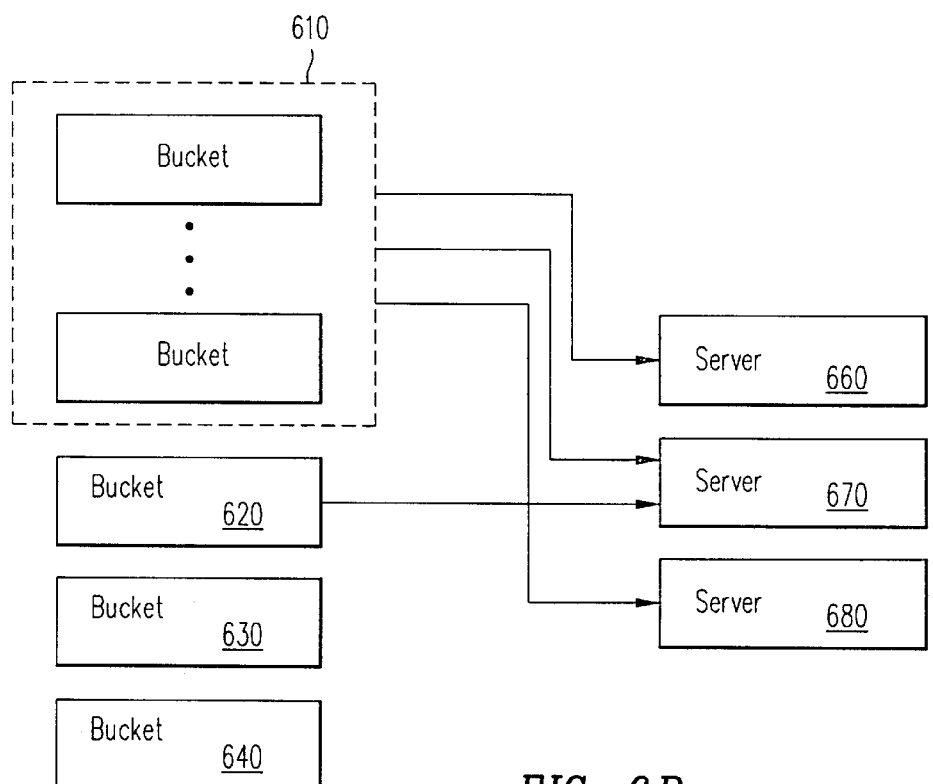
Figure 6C:
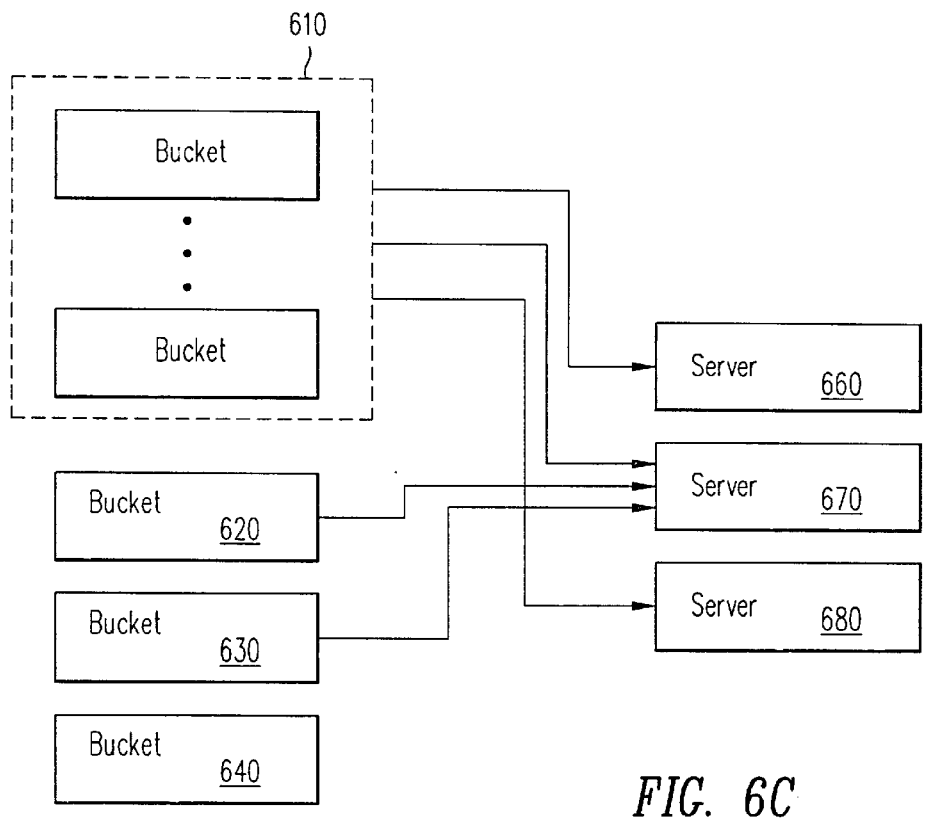
Figure 6D:
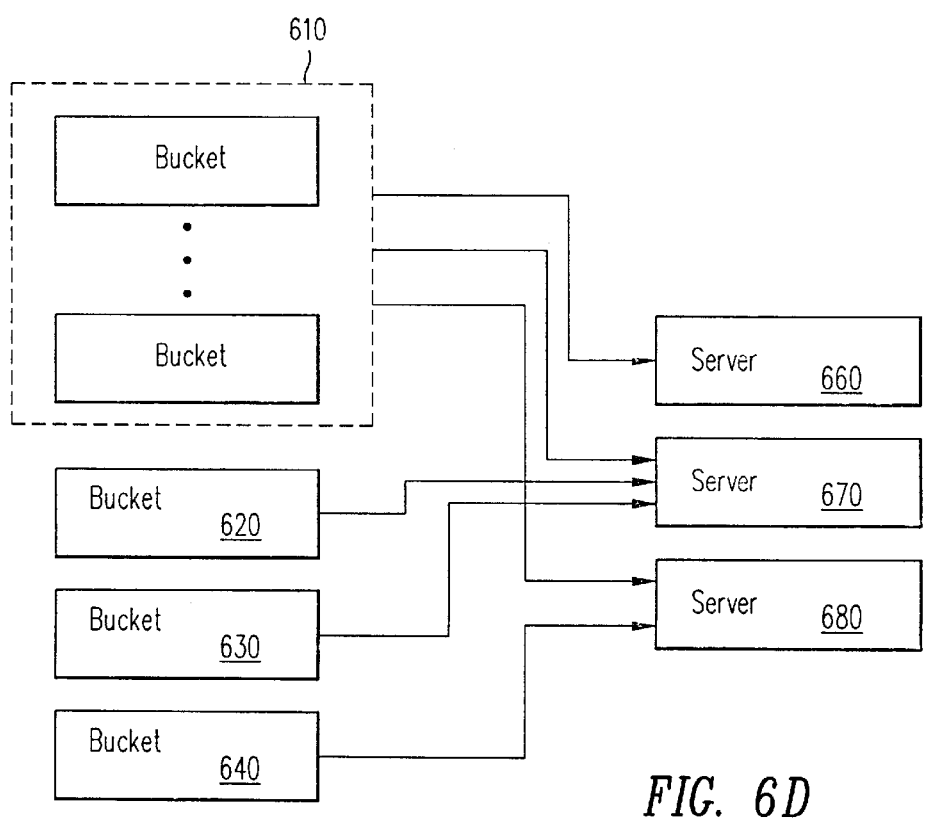

FIGS. 5(a) and 5(b) illustrate multi-mode buckets used in some embodiments of the present invention. Specifically, buckets can be in low granularity mode or high granularity mode. Buckets in first plurality of buckets 310 begin in low granularity mode. In certain situations (as described below), a bucket in first plurality of buckets 310, such as bucket 310_0, is placed into high granularity mode by bucket controller 430. In high granularity mode, new data requests in bucket 310_0 are separated into a plurality of child buckets 520. Child buckets are created to be in low granularity mode. Assignment of data requests from bucket 310_0 to plurality of child buckets 520 is done by straight selection. In one embodiment, plurality of child buckets 520 contains one child bucket for each client having pending data requests in bucket 310_0. If additional data requests from different clients are sent to bucket 310_0, bucket controller 430 creates additional child buckets in plurality of child buckets 520. Bucket controller 430 may place other buckets in first plurality of buckets 310 into high granularity mode to create additional pluralities of child buckets.

In some embodiments of the present invention, buckets are assigned to one of several states to track whether a bucket is in low or high granularity mode. The bucket states for one embodiment include: NOT ASSIGNED, ASSIGNED LOW, ASSIGNED TRANSITION HIGH, ASSIGNED HIGH, and ASSIGNED TRANSITION LOW. Buckets, which are not yet assigned to a server are in the NOT ASSIGNED state. First plurality buckets when assigned to a server are in the ASSIGNED LOW state.

Buckets, which are in high granularity mode and already assigned to a server are in the ASSIGNED HIGH state.

When bucket controller 430 changes the mode of a bucket from low granularity to high granularity, the bucket is in the ASSIGNED TRANSITION HIGH state. When in this state, additional data requests from different clients that do not correspond to a child bucket create additional child buckets. All the child buckets are assigned to the same server as the first plurality bucket.

When the bucket completes the transition to high granularity, the state of the bucket changes to the ASSIGNED HIGH state. In this state, the first plurality of buckets are no longer assigned to a server. Data requests from clients that do not correspond to a child bucket create additional child buckets. In this state, different child buckets are assigned to different servers.

When bucket controller 430 changes the mode of a bucket from high granularity to low granularity, the bucket is in the ASSIGNED TRANSITION LOW state. In this state, the first plurality of buckets are assigned to a server. Data requests from clients that do not correspond to a child bucket do not create additional child buckets. These data requests are sent to the server assigned to the first plurality bucket.

When the bucket completes the transition to low granularity mode, the state of the bucket changes to the ASSIGNED LOW state.

As explained below, the buckets are used to forward data requests from clients to servers. If a bucket does not receive a data request in some fixed time, i.e., the time-out period, the bucket transitions to the NOT ASSIGNED state.

As explained above, as data requests are received by load balancer 400, bucket selector 410 assigns the data requests to first plurality of buckets 310 (FIG. 3). If a bucket in first plurality of buckets 310 is in high granularity mode, the data requests are further divided into a plurality of child buckets belonging to the bucket in first plurality of buckets 310 (FIG. 3). Server selector 420 (FIG. 4) assigns unassigned buckets which have active data requests to a server in plurality of servers 320 (FIG. 3).

Specifically, whenever an unassigned bucket receives a data request, server selector 420 assigns that bucket to the server with the most credit as calculated by credit calculator 450. In embodiments using states, the state of the bucket is changed from NOT ASSIGNED to ASSIGNED LOW. Once a bucket is assigned to a server, the bucket remains assigned to that server until the bucket times out due to lack of data requests, which causes the bucket to change to the NOT ASSIGNED state, or until bucket controller 430 forces the bucket to high granularity mode.

If bucket controller 430 forces a bucket, for example bucket 310_0 (FIG. 3), to high granularity mode, the state of the bucket is changed to ASSIGNED TRANSITION HIGH. Bucket controller 430 then creates a plurality of child buckets 520, each of which is in the ASSIGNED LOW state. Some network data requests, such as TCP data requests, can not be reassigned to a different server. Therefore, one embodiment of load balancer 400 does not reassign any of the pending data requests. However, since some network data requests, such as UDP data requests, are reassignable, another embodiment of load balancer 400 reassigns pending data requests which can be reassigned to child buckets.

As new data requests are routed to bucket 310_0 by bucket selector 410, bucket controller 430 routes the data requests to the appropriate child bucket. If an appropriate child bucket is not found and a new child bucket is created, server selector 420 assigns the child bucket to the server with the most credit. The state of the child bucket then transitions to the ASSIGNED LOW state. Thus, each unassigned bucket which has a data request is assigned by server selector 420 to the operational server which currently has the most credit.

Operational servers are assigned credits by the credit calculator 450. Credit calculator 450 determines the credit of each operational server based on the relative power of each server and the load on each server. Credit calculator 450 determines which servers are underloaded relative to the power of each operational server. Underloaded servers have loads which are smaller than overloaded servers relative to the power of each server in some embodiments, credit calculator 450 receives load information directly from each server. In other embodiments, the load on an operational server is determined by load estimator 460, as explained below. Generally, the load on each server is reduced to a scalar number. If the servers in plurality of servers 320 are not of equal power, credit calculator 450 should be provided with a relative power rating for each server. Intone embodiment of credit calculator 450, the relative power rating of each server is provided as a scalar number.

Method Description

Integer computations are faster in a computer than floating point computations. Thus all calculations are scaled appropriately to employ only integer calculations at the expense of a certain loss of computational precision. Two different scaling factors are used—namely WeightScale and LoadScale. In one embodiment he both of the scaling factors are 1000.

Specifically, the weight, $\overline{Wi}$, of each server is computed by dividing each power rating by the sum of the power ratings, as shown in equation 1:

$$\overline{Wi} = WeightScale * Pi \left/ \left( \sum_{n=0}^{S-1} Pn \right) \right.$$  (1)

where Pi is the power rating of each server i (numbered from 0 to S−1) and $\overline{Wi}$ is the weight of each server. The sum of the weights of every server is equal to WeightScale, and each weight is in the range of one to WeightScale. The weights are computed every time the set of operational servers changes.

Specifically, the credit calculator 450 at periodic intervals calculates a weighted load for each server, as shown in equation 2:

$$\overline{Li} = LoadScale * Li / \overline{Wi}$$  (2)

where Li is the load on server i (numbered from 0 to S−1) and $\overline{Li}$ is the weighted load on server i.

The load normalizer is calculated from $\overline{Li}$ as shown in equation 3:

$$LN = \min_{i=0}^{S-1} abs(\overline{Li})$$  (3)

Specifically, the credit calculator 450 calculates the credit of each server, Ki, by subtracting the normalized weighted load of the server from the weight of the server, as shown in equation 4:

$$Ki = \overline{Wi} - (\overline{Li}/LN)$$  (4)

A flow weight is calculated from Ki as shown in equation 5:

$$Fw = \min_{i=0}^{S-1} abs(Ki)$$  (5)

Servers that are overloaded relative to their power ratings may have negative credits, and servers that are underloaded relative to their power rating may have positive credits. The server that is the most underloaded has the largest credit.

Instead of recalculating the credit of every server after a bucket is assigned, some embodiments of load balancer 400 reduce the computational overhead of credit calculator 450 by approximating the effect of a new bucket assignment. When server selector 420 assigns a bucket to a server, it calculates a flow adjustment for said server as shown in equation 6:

$$Fa = LoadScale * Fw / \overline{Wi} \quad (6)$$

Specifically, when server selector 420 assigns a bucket to a server, it adjusts the credit of the server as shown in equation 7:

$$Ki = Ki - Fa \quad (7)$$

FIGS. 6(*a*)–6(*d*) illustrate the computation performed. Buckets in plurality of buckets 610 are already assigned to server 660, server 670 and server 680. Buckets 620, 630, and 640 are unassigned and will be in the NOT ASSIGNED state in embodiments using bucket states. The power rating of server 660 is 10, the power rating of server 670 is 20, and the power rating of server 680 is 30. The algorithm implicitly normalizes all quantities to an idealized server and the effective load that the idealized server experiences. In the following discussion, the result of calculations in Table 1 is compared with an idealized server. The idealized server has 1000 units of capacity.

The weights (or relative capacities) for servers 660, 670 and 680 are 167, 333, and 500, respectively (and sum up to the idealized servers capacity).

Table 1 shows the computational results at 2 time epochs. All computations are done with integer arithmetic. This ensures that the computations are fast. To avoid loss of precision due to integer computations, a scaling factor is used.

In Table 1, rows 1 and 2 are computed by credit calculator 450 every time the set of operational servers changes.

Row 1: User defined power ratings ($P_i$).

Row 2: The weight (or relative computational capacity) for each server ($W_i$) in accordance with equation 1.

At time epoch t, load estimator 460 gets the load vector and converts it into a scalar quantity $L_i$. Since the servers are of different computing capacity, load estimator 460 normalizes the loads before they can be compared. Intuitively, a load of 100 units to a server of capacity 10 should equal a load of 200 units to a server of capacity 20. Thus, load estimator 460 normalizes based on the inverse of the server weights. Server credits are computed periodically to decide which server has the maximum capacity available. In Table 1, rows 3 to 7, show the computation of server credits by credit calculator 450 at epoch t when the raw loads are all equal.

Row 3: Current load per server ($L_i$). This is computed from a load vector.

Row 4: The weighted load for each server is computed in accordance with equation 2. Note that even though each server has the same load, it represents a larger load for server 660 than for server 670 or server 680. The effective load for an idealized server is the sum of the normalized loads for all servers;

Row 5: To relate the load to capacity, the load normalizer LN is computed in accordance with equation 3. Evidently, this value has to be a function of the current load.

Row 6: A normalized estimate of computational resources used by the current load is subtracted from the server's weight to arrive at the server's credits ($K_i$) in accordance with equation 4. Note that the idealized server's credits can be computed in two different ways. In one method, we use the same formula that we use for each server. Alternately, we could sum up the credits of all servers. Both methods should come out to be equal (or very nearly equal, due to integer arithmetic).

TABLE 1

Motivation for Load Balancing Algorithm

|   |   | Ideal | Server 660 | Server 670 | Server 680 |
|---|---|---|---|---|---|
| 1 | Power rating |  | 10 | 20 | 30 |
| 2 | Server Weight | 1000 | 167 | 333 | 500 |
| 3 | Load at time t |  | 100 | 100 | 100 |
| 4 | Weighted load at time t | 110 | 60 = (100 * 100)/167 | 30 = (100 * 100)/333 | 20 = (100 * 100)/500 |
| 5 | Load normalizer at time t | 20 |  |  |  |
| 6 | Server credits at time t | 995 | 164 = 167 − 60/20 | 332 = 333 − 30/20 | 499 = 500 − 20/20 |
| 7 | Flow weight at time t | 164 |  |  |  |
| 8 | Flow adjustment at time t + k | 164 | 98 = 100 * 164)/167 | 49 = 100 * 164)/333 | 32 = (100 * 164)/500 |
| 9 | Load at time l |  | 300 | 200 | 50 |
| 10 | Weighted load at time l | 249 | 179 = (100 * 300)/167 | 60 = (100 * 200)/333 | 10 = (100 * 50)/500 |
| 11 | Load normalizer at time l | 10 |  |  |  |
| 12 | Server credits at time l | 973 | 150 = 167 − 179/10 | 324 = 333 − 90/10 | 499 = 500 − 10/10 |
| 13 | Flow weight at time l | 150 |  |  |  |
| 14 | Flow adjustment at time l + m | 150 | 89 = (100 * 150)/167 | 45 = (100 * 150)/333 | 30 = (100 * 150)/500 |

Row 7: Finally, an estimate of computational use by a new flow is needed for each server. Towards this goal, we compute the flow weight in accordance with equation 5. This is also the amount that we must deduct from the idealized server's credits when a flow is assigned to it. Whenever a flow is assigned to a server at a later time epoch (say t+k), the computational resource to be subtracted from the server's credits is shown in Table 1, rows 8 (in accordance with equation 6). This credit adjustment is performed by server selector 420 whenever a bucket-to-server assignment occurs.

Row 8: The computational resource that a flow consumes for each server is computed in accordance with equation 6. This is the value to deduct from the server's credits when a new bucket is assigned to the server.

Note that we can assign three flows to server 680, two flows to server 670, and, one flow to server 660, and each individual server's credits would be diminished by the same amount.

In Table 1, rows 9 to 14 show the computation at another epoch when the raw loads are not equal.

Since the bucket debit amount is only an approximation of the load added to a server by a bucket, credit calculator 450 must periodically recalculate the credit of every server using load information of load estimator 460. For a typical internet web server business, recalculation of the server's credits should be performed every ten to twenty seconds. Recalculation should be performed more often if a large number of data requests are received.

As explained above, load estimator 460 provides credit calculator 450 with an estimate of the load on each server. Common measures of the load on a server are based on the number of data requests, the number of data packets received by the server, the number of bytes received by the server, the number of data packets sent by the server, the number of bytes sent by the server, the processor activity on the server, and the memory utilization on the server. Because load balancer 400 is primarily designed to balance the network load on a plurality of servers, load estimator 460 typically uses load measures based on network traffic to the server. Thus, most embodiments of load estimator 460 use load measures based on the number of data requests received by the server, the number of data packets received by the server, the number of bytes received by the server, the number of data packets sent by the server, or the number of bytes sent by the server.

One embodiment of the load estimator 460 uses a combination of the number of data packets received by the server, the number of bytes received by the server, the number of data packets sent by the server, and the number of bytes sent by the server. This embodiment of load estimator 460 forms a load vector with four scalar quantities corresponding to the number of data packets received by the server, the number of bytes received by the server, the number of data packets sent by the server, and the number of bytes sent by the server. This embodiment of load estimator 460 calculates the load of a server using the cross product of the load vector with a weighting vector, having four scalar weights. Thus, the load of a server is calculated as shown in equation 8:

$$L = <P\_in, B\_in, P\_out, B\_out> \otimes <W\_pin, \quad (8)$$
$$W\_bin, W\_pout, W\_bout>$$
$$= P\_in * W\_pin + B\_in * W\_bin + P\_out * W\_pout +$$
$$B\_out * W\_bout$$

where P_in is the number of packets received by the server, B_in is the number of bytes received by the server, P_out is the number of packets sent by the server, B_out is the number of bytes sent by the server, W_pin is the weight assigned to the number of packets received by the server, W_bin is the weight assigned to the number of bytes received by the server, W_pout is the weight assigned to the number of packets sent by the server, and W_bout is the weight assigned to the number of bytes sent by the server. In most embodiments, the weight vector is provided by the user of load balancer 400. However, some embodiments hard-code the weight vector in firmware, software, or hardware.

As explained above, bucket controller 430 converts buckets from low granularity mode to high granularity mode to balance the load on the servers. Bucket controller 430 works in conjunction with skew detector 440. Skew detector 440 determines when the load on the servers are skewed, i.e. unbalanced. Specifically, skew detector 440 compares a measure of skewness against a skew threshold. If the absolute value of the measure of skewness is greater than the skew threshold, skew detector 440 causes bucket controller 430 to change one or more buckets from low granularity mode to high granularity mode.

To keep the measure of skew independent of the design of the load estimator 460, only normalized measures of skew are used. Thus, in one embodiment, the measure of skewness used by skew detector 440 is given in equation 7. In another embodiment, the measure of skewness maybe computed by equation 8.

$$\overline{Li} = Li \bigg/ \left( \sum_{n=0}^{S-1} Ln \right) \quad (7)$$

$$\overline{Li} = Li \bigg/ \left( \sum_{n=0}^{S-1} (Ln)^2 \right) \quad (8)$$

If skew detector 440 directs bucket controller 430 to convert one or more buckets from low granularity mode to high granularity mode, bucket controller 430 must determine which bucket to convert. In one embodiment, exactly one bucket is selected for transition from low to high granularity state. In this embodiment, one bucket is selected at random from the set of buckets assigned to the server with the largest load.

In another embodiment, one or more buckets are selected for transition from low to high granularity state. For each server that has a skewed load, one bucket is selected at random from the set of buckets assigned to that server. In still another embodiment, a fuzzy logic controller with a set of rules for bucket selection is used.

The transition of a bucket from low granularity mode to high granularity mode is not instantaneous. As explained above, in some embodiments the bucket first transitions to the ASSIGNED TRANSITION HIGH state before reaching the ASSIGNED HIGH state. After a configurable amount of time has transpired, the bucket controller 430 forces the bucket in high granularity state to low granularity state. Therefore, in most embodiments of load balancer 400, bucket controller 430 only converts one bucket from low granularity mode to high granularity mode when skew detector 440 detects a skewed load. Skew detector 440 should then wait for a time before rechecking for a skewed load. However, some embodiments of load balancer 400 may cause bucket controller 430 to convert a plurality of buckets every time that skew detector 440 detects a skewed load.

Figure 7:
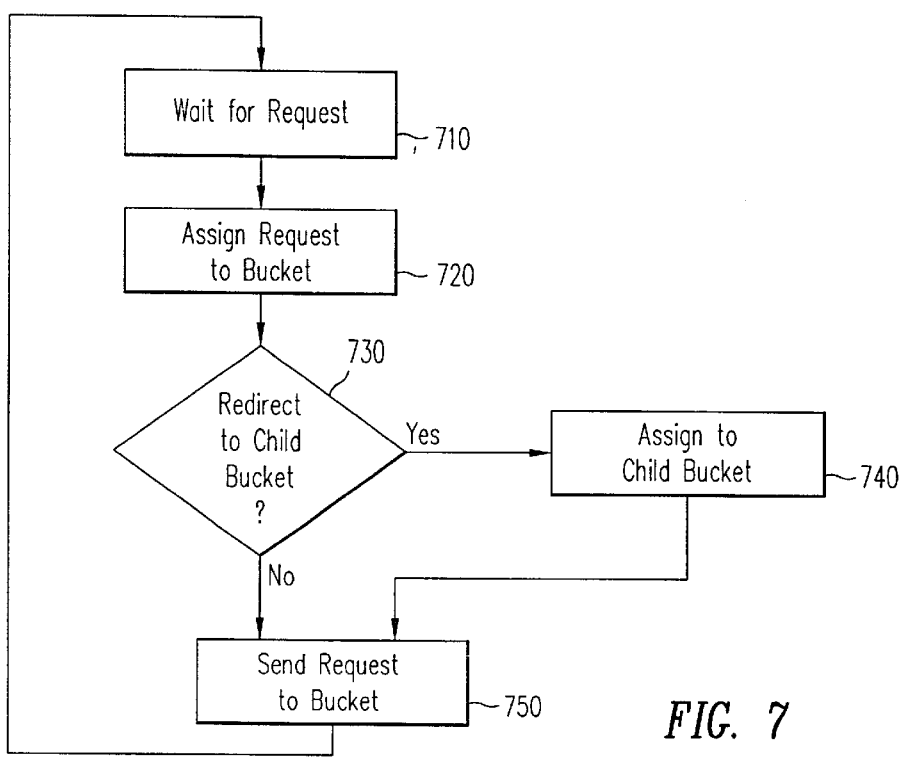
FIGS. 7, 8 and 9 are simplified flow charts summarizing the action performed by the load balancer of this invention.
Figure 8:
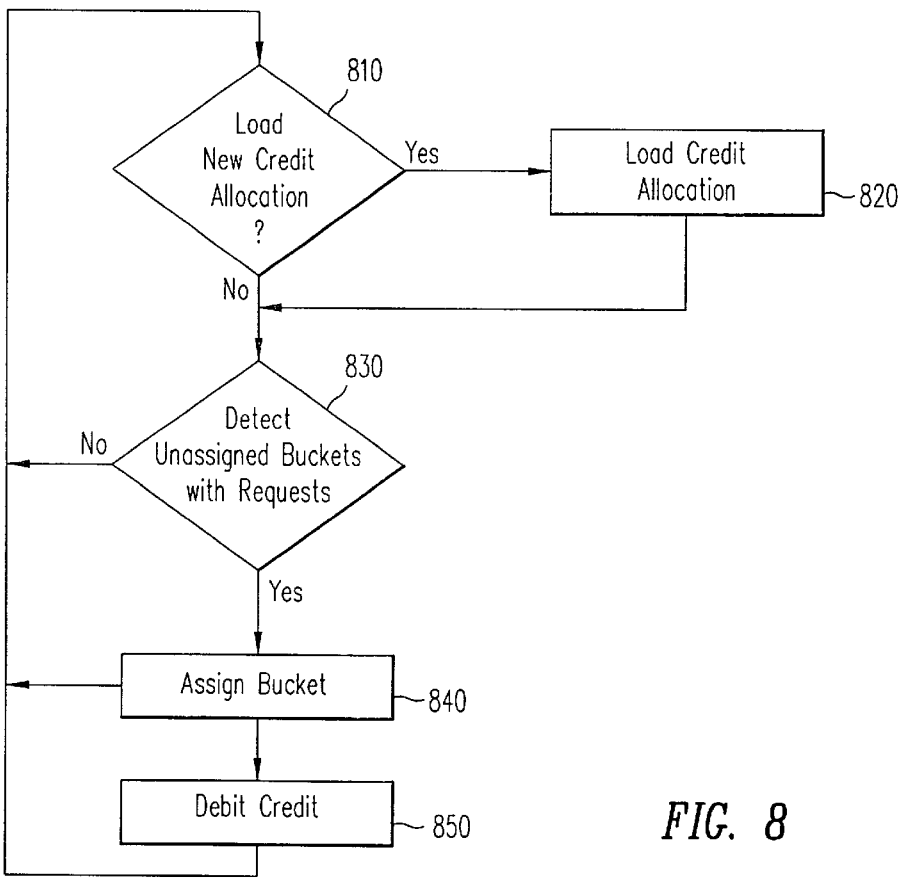
Figure 9:
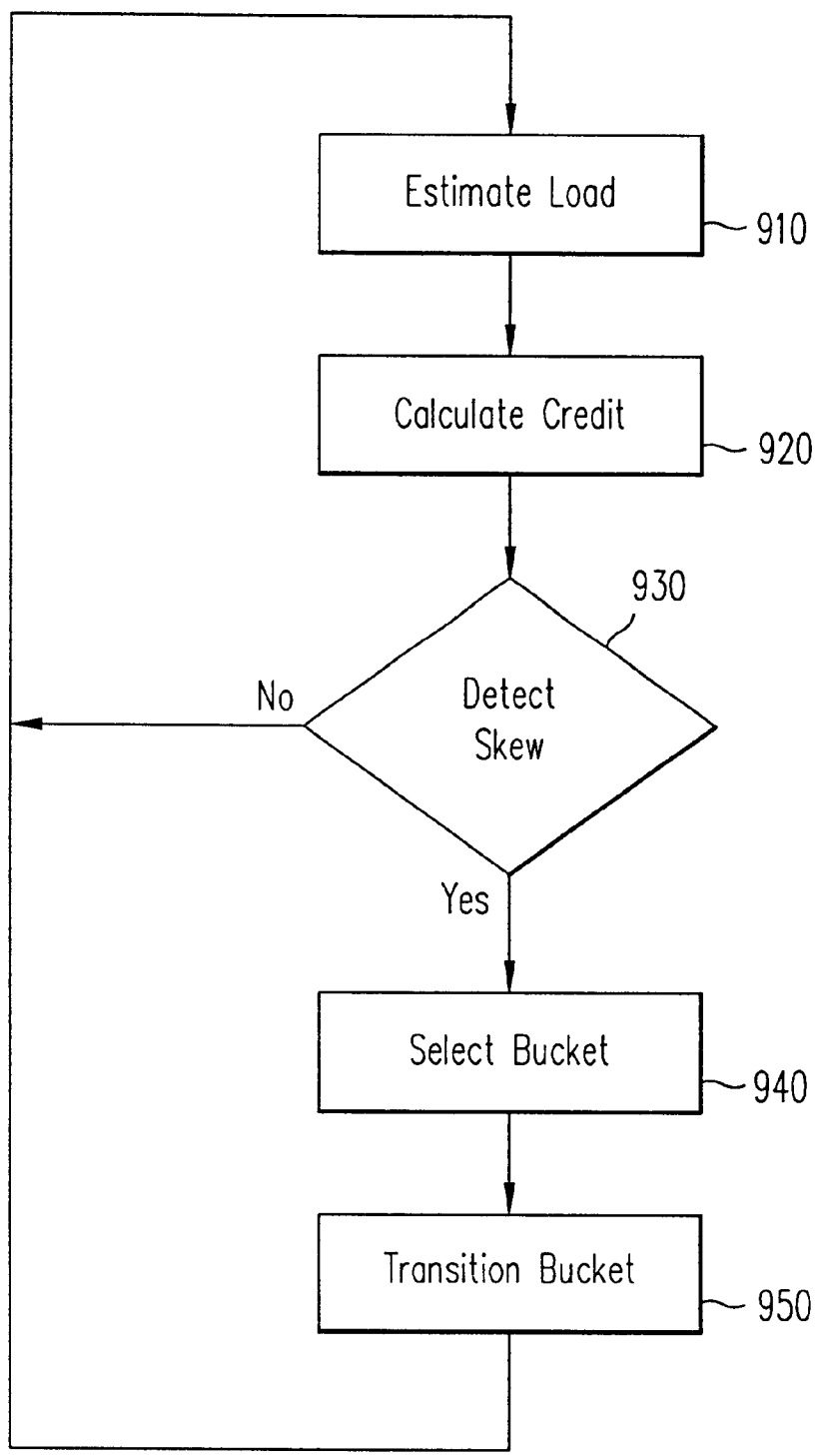

FIGS. 7, 8, and 9 are three simplified flow charts which summarize the actions performed by load balancer 400. The processes of the three flow charts of FIGS. 7, 8, and 9 are performed simultaneously in load balancer 400. Specifically, FIG. 7 summarizes the flow of a data request through load balancer 400. In WAIT FOR DATA REQUEST 710, load balancer 400 waits for data requests from network 110. When a data request is received, the data request is assigned to a bucket in ASSIGN REQUEST TO DATA BUCKET 720. Once the data request is assigned to a bucket, load balancer 400, or more specifically bucket controller 430 (FIG. 4), must determine if the data request must be redirected to a child bucket in REDIRECT TO CHILD BUCKET? 730. If the data request must redirected, the data request is directed to a child bucket in ASSIGN TO CHILD BUCKET 740.

Once the data request is properly assigned to a bucket or a child bucket, the data request is sent to the server to which the bucket or the child bucket is assigned in SEND REQUEST TO BUCKET 750. SEND REQUEST TO BUCKET 750 may be delayed if the bucket is not yet assigned. The bucket is assigned by the process described by the flow chart of FIG. 8. Load balancer 400 then returns to WAIT FOR DATA REQUEST 710. Although the flow chart of FIG. 7 shows a sequential processing of data requests, data requests are actually pipelined in load balancer 400, since bucket selector 410 can assign data requests to buckets simultaneously as server selector 420 assigns buckets to servers and bucket controller 430 controls buckets.

FIG. 8 summarizes the process of assigning buckets to servers for server selector 420. In LOAD NEW CREDIT ALLOCATION? 810, load server selector 420 must determine whether to load a new credit allocation from credit calculator 450. If a new credit allocation is required, server selector 420 loads the credit allocation in LOAD CREDIT ALLOCATION 820. In either case, server selector 420 then detects if any unassigned bucket, i.e., buckets in the NOT ASSIGNED state, contain data requests in DETECT UNASSIGNED BUCKETS WITH REQUESTS 830. If no unassigned buckets contains contain data requests, server selector 420 returns to LOAD NEW CREDIT ALLOCATION? 810. Otherwise, server selector 420 assigns the unassigned bucket containing a data request to the server with the most credit in ASSIGN BUCKET 840. For embodiments of load balancer 400 using bucket debit amount approximation as described above, server selector 420 subtracts the bucket debit amount from the credit of the server receiving the bucket assignment in DEBIT CREDIT 850. Then server selector 420 returns to LOAD NEW CREDIT ALLOCATION? 810. For embodiments not using bucket debit amount approximation, server selector returns to LOAD NEW CREDIT ALLOCATION? 810 directly from ASSIGN BUCKET 840.

FIG. 9 summarizes the interaction of load estimator 460, credit calculator 450, skew detector 440, and bucket controller 430 in load balancer 400. In ESTIMATE LOAD 910, load estimator 460 estimates the load of the servers as described above. Credit calculator 450 uses the load estimates from load estimator 460 to calculate the credit of each server in CALCULATE CREDIT 920. Skew detector 440 then detects whether the load on the servers is skewed in DETECT SKEW 930. If the load on the servers is not skewed, load balancer 400 returns to ESTIMATE LOAD 910. If the load on the servers is skewed, bucket controller 430 selects a bucket in SELECT BUCKET 940 and causes the bucket to transition from low granularity mode to high granularity mode in TRANSITION BUCKET 950. Load balancer 400 then returns to ESTIMATE LOAD 910.

In addition to the three processes illustrated in FIGS. 7, 8, and 9, buckets which are assigned can become unassigned, i.e., transition to the NOT ASSIGNED state, if the buckets do not receive data requests after a time-out period.

Some embodiments of load balancer 400 provide for an administratively-controlled graceful take-down of a selected server from the plurality of servers. In this method, the bucket controller 430 forces all buckets currently assigned to said server to ASSIGNED TRANSITION HIGH state for a specified period of time. After the time has transpired, the bucket controller 430 forces the bucket to the ASSIGNED TRANSITION LOW state. In this way, traffic-assigned to the server is reassigned without disrupting client-to-server communication.

Figure 10:
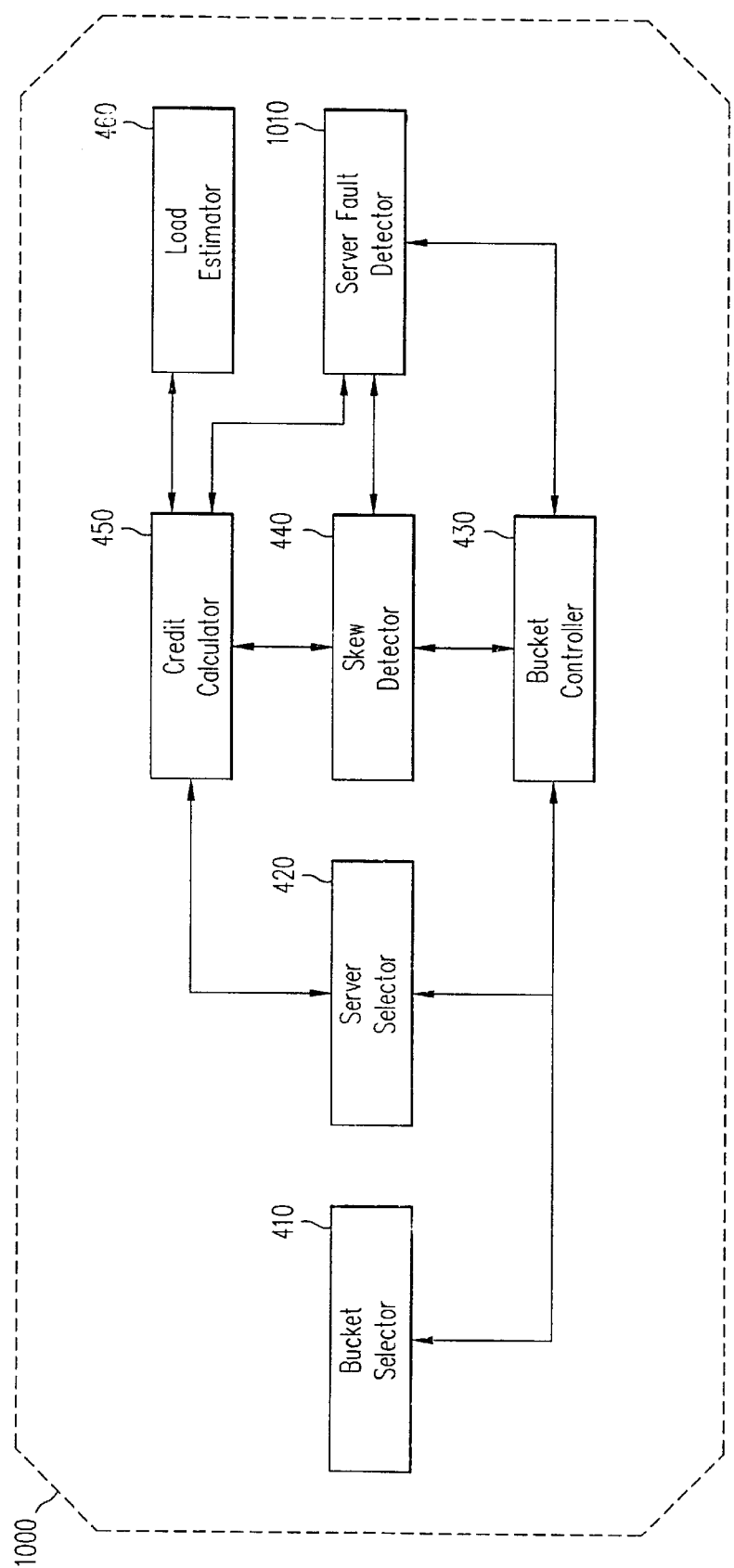
FIG. 10 is a block diagram illustrating the operation of one embodiment of the server fault detection of this invention.

Some embodiments of load balancer 400 are enhanced to handle server faults, i.e., a server developing a problem which causes the server to not respond or to respond poorly to data requests. As shown in FIG. 10, a server fault detector 1010, which detects server faults, is included in a load balancer 1000. In some embodiments, server fault detector 1010 and load estimator 460 are combined.

Server fault detector 1010 can be configured to detect server faults in a variety of ways including many well-known fault-detection routines. For example, server fault detector 1010 could "ping" each server periodically to determine if the server is up. Server fault detector 1010 can also poll the servers periodically to request the status of each server. In one embodiment of load balancer 1000, in addition to polling the servers, server fault detector 1010 analyzes the number of incoming and outgoing packets of a server to determine if the server has a server fault. For example, if a server receives many incoming packets which most likely are data requests, and has little or no outgoing packets, the server is most likely experiencing a server fault.

Some embodiments of server fault detector 1010 are configured to detect link faults as well as server faults. Since link faults may completely cut off one or more servers from load balancer 1000, link faults are equally damaging as server faults. In one embodiment, the hardware can detect link faults.

Once server fault detector 1010 determines that a server is down, i.e., the server has a server fault or a link fault, server fault detector 1010 marks the server as inactive and removes it from the set of operational servers. Server fault detector 1010 then informs credit calculator 450 about the change in the set of operational servers. Credit calculator 450 then recomputes each server's normalized weight and credits. Credit calculator will ignore inactive servers in performing calculations. The server selector ignores inactive servers when performing bucket assignments.

Server fault detector 1010 also informs bucket controller 430 of the identity of a down server. In one embodiment of load balancer 1000, bucket controller 430 deassigns all buckets assigned to the down server. Thus, the state of the buckets previously assigned to the down server transitions to the NOT ASSIGNED state. Server selector 420 can then reassign the buckets that were previously assigned to the down server to the other servers, as described above. In another embodiment of load balancer 1000, bucket controller 430 reassigns all of the buckets that were assigned to the down server to another server, typically the server with the most credit. Load balancer 1000 rebalances the load among the remaining servers as described above.

Server fault detector 1010 should continue to monitor all inactive servers, to detect when an inactive server may be repaired. Some embodiments of server fault detector 1010 test a repaired server to ensure that the server is actually repaired. Once the down server is repaired to the satisfaction of server fault detector 1010, server fault detector 1010 marks the server as active and adds it to the set of operational servers. Server fault detector 1010 then informs credit calculator 450 about the change in operational servers. Credit calculator 450 then recomputes each server's normalized weight and credits. Since no buckets are assigned to the previously-down server, the previously-down server should have no load and, therefore, a large credit. Consequently, server selector 420 assigns unassigned buckets with data requests to the previously-down server as described above. In time, load balancer 400 is able to rebalance the load on all of the servers. To hasten the load balancing process, skew detector 440 may cause bucket controller 430 to move one or more buckets from low granularity mode to high granularity mode as described above.

Figure 11:
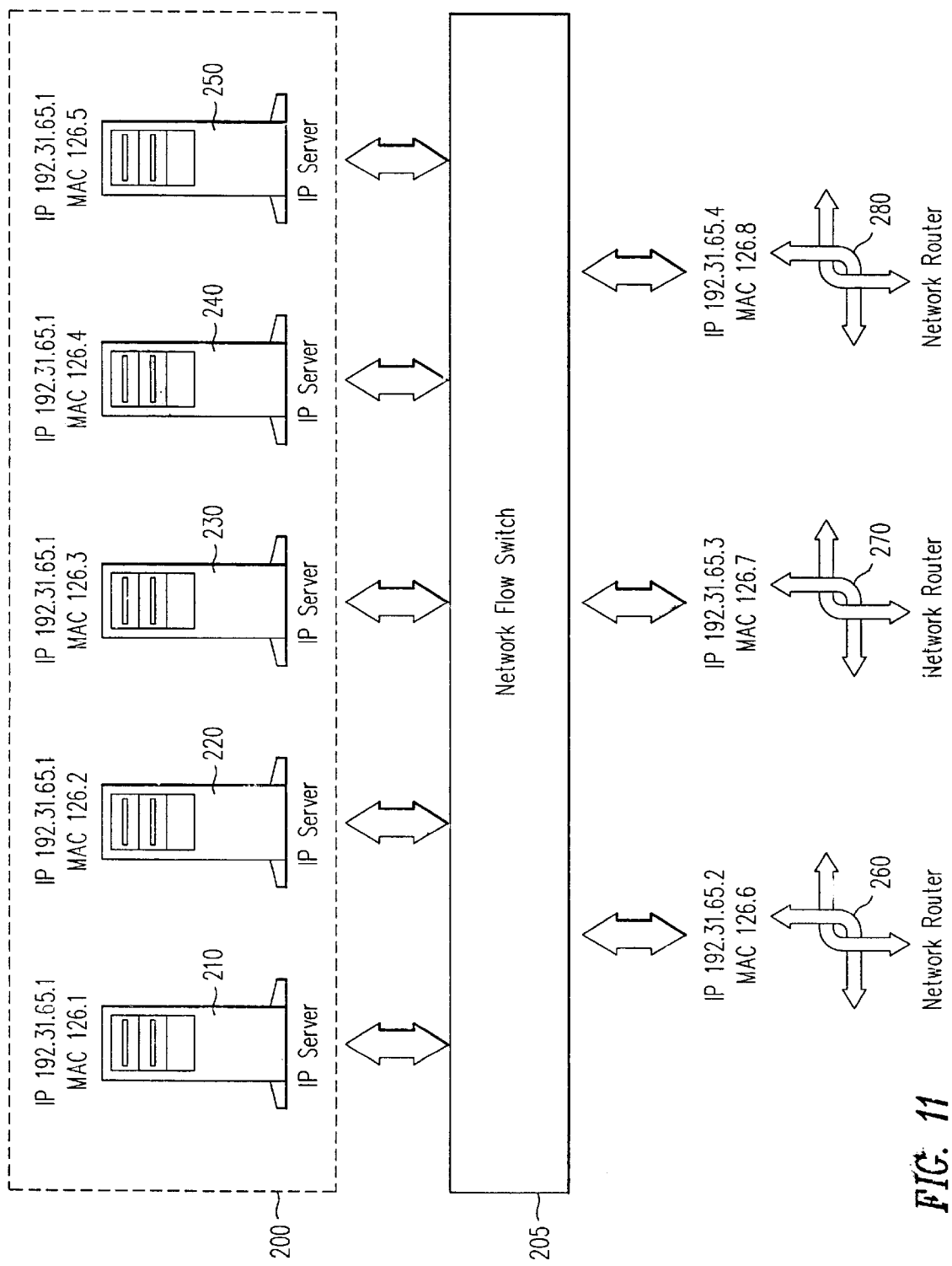
FIG. 11 illustrates a load balancer in the form of a flow switch and in which each of a plurality of servers has the same IP address.

FIG. 11 illustrates an overall system in which the present invention is utilized. FIG. 11 shows a plurality of servers 210, 220, 230, 240, 250 each having the same IP address. Servers are connected to a plurality of network routers 260, 270, 280 through a network flow switch 205 in accordance with this invention. The structure and method of operation of the flow switch one disclosed in the above-referenced copending application Ser. No. 08/994,709, now U.S. Pat. No. 6,266,335, which is incorporated herein by reference in its entirety.

In the various embodiments of this invention, methods and structures have been described that provide dynamic load balancing and server fault tolerance for a plurality of servers. By monitoring the load on the servers and dynamically allocating buckets based on the credit of each server, embodiments of the present invention can maintain a balanced load on the servers. Furthermore, by monitoring the status of the servers, embodiments of the present invention can gracefully handle server faults by distributing the load of a down server among the remaining operational servers.

The various embodiments of the structures and methods of this invention that are described above are illustrative only of the principles of this invention and are not intended to limit the scope of the invention to the particular embodiments described. In view of this disclosure, those skilled in the art can define other bucket selectors, server selectors, skew detectors, credit calculators, load estimators, bucket controllers, server fault detectors, load vectors, weighting vectors, credit allocation rules, load estimation rules, fault detection rules, buckets, bucket states, or network configurations, and use these alternative features to create a method, circuit, or system according to the principles of this invention.

APPENDIX A

Server Credit Calculation algorithm in C style pseudo code

```
ComputeNormalizedWeights (cluster cO)
{
    uint_t    cw;      /* Weight for cluster */
    /* This computes the normalized weights used
     * in ComputeServerCredits ( ).
     */
    cw = 0; for (each server sp in cluster cO)
    {
        if (sp->load.weight == O)
            sp->load.weight = 1; /* Weight must be at least 1 */
        if (server_IsDown (sp))
            continue;
        cw += sp->load.weight;
    }
    if (CW == 0)
    {
        return ERROR;
    }
```

APPENDIX A-continued

```
    for (each server sp in cluster cO)
    {
        if (server_isDown (sp))
            continue;
        /* Compute Wi for server */
        sp->load.nw = (sp->load.weight * SCALE_WEIGHT)/cw;
    }
    return OK;
}
ComputeServerCredits (cluster cO)
{
    int      Norm;    /* Load normalizer for cluster */
    int      Cf;      /* Flow weight for cluster */
    Norm = 0;
    for (each server sp in cluster c0)
    {
        uint_t cl   /* Server's scalar load */
        if (server_IsDown (sp))
            continue;
        /* Compute the load for the server -- Li
         * The load vector is converted into a scalar.
         */
        cl = inner_product (sp load delta, VectorToScalar);
        /* Compute weighted load -- Li */
        sp->load.wc1 = (SCALE_LOAD * cl)/sp->load.nw;
        /* Compute the load normalizer -- LN */
        cl = abs (sp->load.wc1);
        if (first OR Norm < cl)
            Norm = cl;
    }
    /* Avoid divide-by-zero traps */
    Norm = (uint_t) max (1, Norm);
    Cf = 0;
    for (each server sp in cluster cO)
    {
        if (server IsDown (sp))
            continue;
        /* Compute server credit -- Ki */
        sp->load.credit = sp->load.nw -
            (sp->load.wc1/ Norm);
        /* Compute cluster's flow weight -- Fw */
        if (first OR Cf < abs(sp->load.credit))
            Cf = abs(sp->load.credit);
    }
    /* Avoid divide-by-zero traps */
    c0->flow_weight = (uint-t) max (1, Cf);
}
```

Bucket to Server Assignment Algorithm in C style pseudo code

```
AssignServer (cluster cO, bucket bO)
{
    server        *select;
    select = NULL;
    /* Pick a server with the highest credit */
    for (each server sp in cluster cO)
    {
        if (NOT server_IsReadyForFlow (sp))
            continue;
        if ((select is NULL) OR
            (select->load.credit <sp->load.credit))
        {
            select = sp;
        }
    }
    if (select != NULL)
    {
        uint_t fa
        set bucket b0 destination record from server select;
        /* Compute flow adjustment for server - Fa */
        fa = (SCALE_LOAD * cluster->flow_weight)/
            select->load.nw;
        /* Update server's credits */
        select->load.credit -= fw;
    }
}
```

Packet Forwarding Algorithm in C style pseudo code

```
For each IP Packet received do
    if ((Cluster = GetClusterByAddress (IP destination address)) = NULL)
```

APPENDIX A-continued

```
{
    bucket = &Cluster->bucket [hash (IP source address)];
    switch (bucket->state)
    {
    case UNASSIGNED:
        AssignServer (Cluster, bucket);
        if (assignment was successful)
            redo switch statement with new state for bucket;
        else
            discard packet
        break;
    case ASSIGNED_LOW:
        if (bucket needs IP Header rewrite)
            rewrite IP Destination Address and adjust IP Checksum and
TCP or UDP Checksum;
        rewrite Ethernet Destination Address;
        send packet on link that connects to server;
        break;
    case ASSIGNED TRANSIT_HIGH:
        secbucket = GetSecondaryBucket (IP source address);
        if (secbucket == NULL)
            secbucket = AddSecondaryBucket (Cluster, bucket, source
address);
        if (secbucket == NULL)
        {
            /* Failed to create secondary bucket */
            discard packet;
            break;
        }
        else
        {
            /* Do not break client to server mapping */
            Copy bucket destination record to
            secbucket;
        }
        if (secbucket needs IP Header rewrite)
            rewrite IP Destination Address and adjust IP Checksum and
TCP or UDP Checksum;
        rewrite Ethernet Destination Address;
        send packet on link that connects to server for secbucket;
        break;
    case ASSIGNED HIGH:
        secbucket = spl_getSecondaryBucket (IP source address);
        if (secbucket == NULL)
            secbucket = spl_addSecondaryBucket (Cluster, bucket,
source address);
        if (secbucket == NULL)
        {
            discard packet;
            break;
        }
        else
        {
            AssignServer (Cluster, secbucket);
        }
        if (secbucket needs IP Header rewrite)
            rewrite IP Destination Address and adjust IP Checksum and
TCP or UDP Checksum;
        rewrite Ethernet Destination Address;
        send packet on link that connects to server for secbucket;
        break;
    case ASSIGNED_TRANSIT_LOW:
        if (bucket is not assigned to a server)
        {
            AssignServer (Cluster, bucket);
        }
        secbucket = GetSecondaryBucket (IP source address);
        if (secbucket == NULL)
        {
            if (',ucket is not assigned to a server)
            {
                discard packet;
                break;
            }
            if (bucket needs IP Header rewrite)
                rewrite IP Destination Address and
                adjust IP Checksum and TCP or UDP Checksum;
            rewrite Ethernet Destination Address;
            send packet on link that connects to server for bucket;
```

APPENDIX A-continued

```
        }
        else
        {
            if (secbucket needs IP Header rewrite)
                rewrite IP Destination Address and adjust IP
Checksum and TCP or UDP Checksum;
            rewrite Ethernet Destination Address;
            send packet on link that connects to server for secbucket;
        }
        break;
    }
}
else
{
    perform normal packet processing;
}
```

We claim:

1. A method for assigning a plurality of data requests among a plurality of servers, said method comprising:

determining a load on each of said plurality of servers, wherein said load on each of said plurality of servers is computed relative to a power rating of each of said plurality of servers;

assigning each of said data requests to a bucket of a first plurality of buckets, wherein said first plurality of buckets outnumber said plurality of servers; and assigning each bucket of said plurality of buckets containing a data request to a server of said plurality of servers in response to said load on each of said plurality of servers;

wherein each of said data requests includes a source address and wherein each of said data requests is assigned to a bucket based on said source address.

2. The method of claim 1, wherein said first plurality of buckets contain B buckets;

each of said buckets in said first plurality of buckets is uniquely numbered from zero to B−1; and a data request of said plurality of data requests is assigned to bucket number said source address of said data request modulo B.

3. The method of claim 1, wherein said assigning each bucket of said plurality of buckets containing a data request to a server of said plurality of servers further comprises:

detecting a first not-assigned bucket having at least one of said data requests; and assigning said first not-assigned bucket to an underloaded server.

4. The method of claim 3, wherein said underloaded server is the most underloaded server.

5. The method of claim 1, wherein assigning each bucket of said plurality of buckets containing a data request to a server of said plurality of servers further comprises:

detecting a first not-assigned bucket having at least one of said data requests;

calculating a credit for each of said servers; and assigning said first not-assigned bucket to a server having a largest said credit.

6. The method of claim 5, further comprising detecting a skewed load on said plurality of servers.

7. A method for assigning a plurality of data requests among a plurality of servers, said method comprising:

determining a load on each of said plurality of servers, wherein said load on each of said plurality of servers is computed relative to a power rating of each of said plurality of servers;

assigning each of said data requests to a bucket of a first plurality of buckets, wherein said first plurality of buckets outnumber said plurality of servers;

assigning each bucket of said plurality of buckets containing a data request to a server of said plurality of servers in response to said load on each of said plurality of servers, including detecting a first not-assigned bucket having at least one of said data requests, calculating a credit for each of said servers, and assigning said first not-assigned bucket to a server having a largest said credit;

detecting a skewed load on said plurality of servers;

selecting a second bucket from said plurality of buckets, wherein said second bucket is in a low granularity mode; and converting said second bucket from said low granularity mode to a high granularity mode.

8. The method of claim 7 wherein:

converting comprises creating a plurality of child buckets; and assigning data requests destined for said second bucket to one of said plurality of child buckets.

9. The method of claim 8 wherein:

assigning each bucket of said plurality of buckets comprises assigning a not-assigned child bucket of the plurality of child buckets to a server having a largest said credit.

10. A load balancer for balancing the load due to a plurality of data requests on a plurality of servers, said load balancer comprising:

a plurality of buckets;

a bucket selector configured to assign each of said data requests to a bucket in said plurality of buckets;

a load estimator or configured to compute a load on each of said plurality of servers, wherein said load on each of said plurality of servers is computed relative to a power rating of each of said plurality of servers; and a server selector configured to dynamically assign any unassigned bucket containing a data request to a server in said plurality of servers in response of the estimated load on each of said plurality of servers, wherein each of said data requests contains a source address; and said bucket selector determines which bucket to assign a specific data request based on said source address of said specific data request.

11. The load balancer of claim 10, wherein said plurality of buckets outnumbers said plurality of servers.

12. The load balancer of claim 10 wherein said server selector assigns an unassigned bucket containing a data request to an underloaded server.

13. The load balancer of claim 12, wherein said underloaded server is a most underloaded server.

14. The load balancer of claim 10, further comprising a credit calculator coupled to said load estimator and configured to calculate a credit for each of said servers to form a plurality of credits.

15. The load balancer of claim 10, wherein said server selector assigns an unassigned bucket containing a data request to a server having a large credit.

16. The load balancer of claim 15, wherein said server selector assigns an unassigned bucket containing a data request to a server having the largest credit.

17. A load balancer for balancing the load due to a plurality of data requests on a plurality of servers, said load balancer comprising:

memory defining a plurality of buckets, wherein said plurality of buckets outnumber said plurality of servers;

a bucket selector configured to assign each of said data requests to a bucket in said plurality of buckets;

a load estimator configured to compute a load on each of said plurality of servers by calculating a credit for each of said servers, wherein said load on each of said plurality of servers is computed relative to a power rating of each of said plurality of servers, and to detect a skewed load on said plurality of servers;

a server selector configured to dynamically assign any unassigned bucket containing a data request to a server in said plurality of servers in response to the estimated load on each of said plurality of servers by detecting a first not-assigned bucket having at least one of said data requests and assigning said first not-assigned bucket to a server having a largest said credit; and a bucket granularizer configured to select a second bucket from said plurality of buckets which second bucket is in a low granularity mode and to convert said first bucket from said low granularity mode to a high granularity mode, in response to a detection of a skewed load.

18. The load balancer of claim 17 wherein:

the bucket granularizer is configured to convert said first bucket by creating a plurality of child buckets; and the bucket selector is configured to assign data requests destined for said second bucket to one of said plurality of child buckets.

19. The load balancer of claim 18 wherein:

the server selector is configured to assign a not-assigned child bucket of the plurality of child buckets to a server having a largest said credit.

20. A method of assigning a plurality of data requests among a plurality of servers, said method comprising:

determining a weight of each server as a ratio of a power rating of the server and a sum of the power ratings of all of the servers;

determining a weighted load of each server as a ratio of a load of the server and the weight of the server;

determining a load normalizer as a minimum one of absolute values of the weighted loads of the servers;

determining a credit of each server as a difference between the weight of the server and a ratio of the weighted load of the server and the load normalizer;

assigning each of said data requests to a bucket of a plurality of buckets; and assigning buckets of said plurality of buckets containing a data request to servers of said plurality of servers that have greatest said credits.

21. The method of claim 20 wherein:

assigning buckets comprises assigning one of the buckets containing a data request to a server of said plurality of servers that has a greatest said credit;

redetermining said credit of said server to which said one of the buckets was assigned; and assigning another one of the buckets containing a data request to a server that currently has a greatest said credit.

22. The method of claim 21 wherein:

said determinings and said redetermining are effected via integer arithmetic.

23. The method of claim 20 further comprising:
determining a flow weight as a minimum one of absolute values of the credits of the servers;
determining a flow adjustment of each server as a ratio of the flow weight and the weight of the server; wherein assigning buckets comprises
    assigning one of the buckets containing a data request to a server of said plurality of servers that has a greatest said credit;
    reducing the credit of said server to which said one of the buckets was assigned by the flow adjustment of said server; and
    assigning another one of the buckets containing a data request to a server that currently has a greatest said credit.

24. The method of claim 23 wherein:
determining a weight comprises scaling said weight by a weight scale;
determining a weighted load comprises scaling said weighted load by a load scale; and
determining a flow adjustment comprises scaling said flow adjustment by the load scale.

25. The method of claim 23 wherein:
said determining and said reducing are effected via integer arithmetic.

26. The method of claim 20 wherein:
determining a weight comprises scaling said weight by a weight scale; and
determining a weighted load comprises scaling said weighted load by a load scale.

27. The method of claim 20 wherein:
said determinings are effected via integer arithmetic.

28. The method of claim 20 wherein:
a load of a server comprises a plurality of ones of:
    a number of data requests received by the server, a number of data packets received by the server, a number of bytes received by the server, a number of data packets sent by the server, and a number of bytes sent by the server.

29. A load balancer for balancing the load due to a plurality of data requests on a plurality of servers, said load balancer comprising:
    a plurality of buckets;
    a bucket selector configured to assign each of said data requests to a bucket of said plurality of buckets;
    a credit calculator configured to determine a weight of each server as a ratio of a power rating of the server and a sum of the power ratings of all of the servers, to determine a weighted load of each server as a ratio of a load of the server and the weight of the server, to determine a load normalizer as minimum one of absolute values of the weighted loads of the servers, and to determine a credit of each server as a difference between the weight of the server and a ratio of the weighted load of the server and the load normalizer; and
    a server selector configured to assign buckets of said plurality of buckets containing a data request to servers of said plurality of servers that have greatest said credits.

30. The load balancer of claim 29 wherein:
the credit calculator is configured to redetermine said credit of a server to which one of the buckets was assigned; and
the server selector is configured to assign said one of the buckets containing a data request to a server of said plurality of servers that has a greatest said credit, and to assign another one of the buckets containing a data request to a server that currently has a greatest said credit.

31. The load balancer of claim 30 wherein:
the credit calculator is an integer arithmetic calculator.

32. The load balancer of claim 29 wherein:
the credit calculator is further configured to determine a flow weight as a minimum one of absolute values of the credits of the servers, to determine a flow adjustment of each server as a ratio of the flow weight and the weight of the server, and to reduce the credit of a server to which one of the buckets was assigned by the flow adjustment of said server; and
the server selector is configured to assign said one of the buckets containing a data request to a server of said plurality of servers that has a greatest said credit, and to assign another one of the buckets containing a data request to a server that currently has a greatest said credit.

33. The load balancer of claim 32 wherein:
the credit calculator is configured to scale said weight of each server by a weight scale and to scale said weighted load of each server and the flow adjustment by a load scale.

34. The load balancer of claim 32 wherein:
the credit calculator is an integer arithmetic calculator.

35. The load balancer of claim 29 wherein:
the credit calculator is configured to scale said weight of each server by a weight scale and to scale said weighted load of each server by a load scale.

36. The load balancer of claim 29 wherein:
the credit calculator is an integer arithmetic calculator.

37. The load balancer of claim 29 wherein:
a load of a server comprises a plurality of ones of:
    a number of data requests received by the server, a number of data packets received by the server, a number of bytes received by the server,
    a number of data packets sent by the server, and a number of bytes sent by the server.

* * * * *